United States Patent [19]

Ballas

[11] 4,162,575
[45] Jul. 31, 1979

[54] ROTARY CUTTING ASSEMBLY

[75] Inventor: George C. Ballas, Houston, Tex.

[73] Assignee: Weed Eater, Inc., Houston, Tex.

[21] Appl. No.: 894,931

[22] Filed: Apr. 10, 1978

Related U.S. Application Data

[63] Continuation of Ser. No. 706,623, Jul. 19, 1976, abandoned.

[51] Int. Cl.² ................. A01D 55/18; B65H 75/14
[52] U.S. Cl. ................................. 30/347; 242/118.4
[58] Field of Search .................... 242/118.4, 118.41; 30/276, 347; 56/12.7, 295

[56] References Cited

U.S. PATENT DOCUMENTS

| | | | |
|---|---|---|---|
| 1,589,177 | 6/1926 | Kendall | 242/118.4 |
| 3,937,419 | 2/1976 | Bon | 242/118.4 |
| 4,097,991 | 7/1978 | Proulx | 30/276 |

FOREIGN PATENT DOCUMENTS 1245177  9/1960  France .................. 242/118.4

Primary Examiner—Jimmy C. Peters

[57] ABSTRACT

An improved cutting assembly for rotary lawn mowers, edgers, trimmers or the like, including a body member arranged for rotating about an axis normal with the cutting plane. At least two cutting lines are attached to the body member on a compound spool for rotation therewith in the cutting plane. The invention includes means for detachably securing the lines to the body member and for storing a supply of the line on the spool so that the line may be paid out as the working portions of the line become shortened through wear. The cutting lines are preferably nonmetallic so as to reduce the hazardous condition which would otherwise be present for the operator and still provide an apparatus which will cut with great efficiency and safety.

1 Claim, 10 Drawing Figures

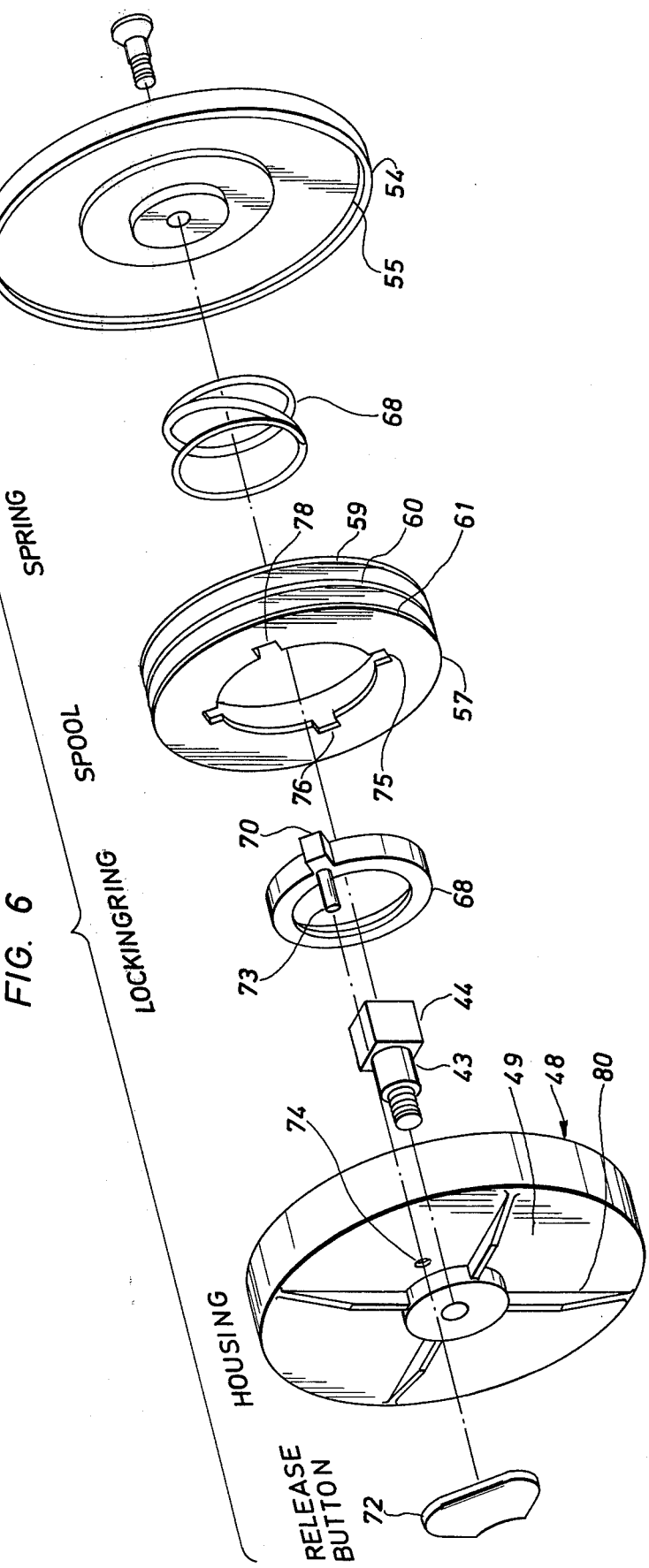

ROTARY CUTTING ASSEMBLY

This is a continuation of application Ser. No. 706,623 filed July 19, 1976, now abandoned.

BACKGROUND OF THE INVENTION

1. Field of the Invention:

This invention relates to an improved cutting assembly in the form of a torary head for a rotary lawn mower, edger, trimmer or the like. The preferred embodiments are in the form of portable hand-held type lawn mowing and edging tools wherein the cutting element is safe in most uses and avoids the hazardous conditions created by prior art devices. More particularly, this invention embodies an improvement over the type of assembly generally depicted in U.S. Pat. No. 3,826,068.

2. Description of the Prior Art:

The prior art is prolix with attempts at solutions to provide a safe, efficient, and simply constructed rotary head for rotary lawn mowers, edgers, trimmer and the like. Heretofore, the rotary head, or cutting blade, of rotary lawn mowers, edgers, and the like, have comprised a rotating metal bar or the like which is rotated at sufficient speeds to effect cutting of grass, weeds, or the like. However, such bars create hazardous conditions in that when they strike certain objects they act upon those objects in a fashion to create and project dangerous missiles which may strike the operator or individuals in the area of work.

Various attempts have been made to overcome the aforesaid hazardous conditions created with rigid-type metal cutting blades of the prior art. Most of these attempts to overcome the problem involve the utilization of some type of flexible flail which will have sufficient resiliency so as not to propel objects which are struck at high velocities. Most of these resilient-type cutting elements of the prior art suffer a disadvantage in that they are not safe and mere resiliency is not sufficient to insure that the dangerous conditions will not be created when rotation is effected at desired cutting speeds. Further, the prior art cutting elements are generally not provided with means for easy replaceability in the event of wearing out and are usually expensive to replace.

The result has been that most of the prior lawn edging apparatus have been unsatisfactory because of the dangerous conditions created by the rotating head. As a consequence, most lawn edging and trimming around trees and the like, which would otherwise be damaged by the metal blades, must be done manually, which is both laborious and time consuming.

There is depicted and described in U.S. Pat. No. 3,826,068, an embodiment of a rotary lawn mower, edger, trimmer or the like, having a disc-like head member arranged to be rotated by a motor, and containing four spools housed therein in diametrically opposed relationship to the shaft of the motor. A length of flexible non-metallic line is coiled about each of the four spools, whereby the free travelling end of each of the four lines extends generally peripherally from its respective spool and the head and whereby the free travelling ends of the four lines will be swung arcuately about upon actuation of the motor to cut vegetation and the like and with the four lines each acting in the fashion of flails.

Use of the device of U.S. Pat. No. 3,826,068, has revealed that, under ideal operating conditions, it will mow, cut, edge, and trim grass and other vegetation effectively. Furthermore, it possesses the significant advantage that it is much safer to use then the more conventional cutters, in that it does not cause stones or other solid objects to be discharged in a dangerous manner, and it is almost completely incapable of causing any significant injury to persons or pets struck by any one or more of the flail line members. In fact, it is a reasonable statement that the device of U.S. Pat. No. 3,826,068, will actually cut substantially only the vegetation to which it is directed.

On the other hand, however, the device of U.S. Pat. No. 3,826,068, is also subject to certain disadvantages such as to limit its practical value to some degree. In the first place, it is of complex construction and is difficult to manufacture by virtue of its four spool arrangement. This multi-spool arrangement results in a device possessing a very complex internal construction. In the second place, the four spool construction of the device renders the device cumbersome to use and cumbersome to repair. The cumbersome construction of four spools also results in unnecessary tangling of the four flail line members. Another disadvantage of the device of U.S. Pat. No. 3,826,068, is that by virtue of its possessing four flail line members, breakage of any one of the lines during use of the device results in unbalancing of the head during rotation. Thus, the fact that the device possesses four flail lines results in more opportunity for line breakage with the result that there is more chance for head unbalance.

These disadvantages of the prior art, and especially the aforementioned U.S. Pat. No. 3,826,068, are overcome with the present invention, and a commercially acceptable vegetation cutter and the like are provided which is not only fully capable of cutting vegetation under most operating conditions, but which is also fully capable of other tasks beyond the capabilities of the device of U.S. Pat. No. 3,826,068. More particularly, however, the embodiment of the present invention is simpler and easier to construct, possesses a less complex internal construction, and eliminates the cumbersome multi-spool arrangement, without sacrifice of the safety features and advantages accorded to the device of U.S. Pat. No. 3,826,068, and provides a more balanced head in the event of line breakage during operation. Thus, the present invention includes a single spool of compound construction versus the multi-spools of the device of the aforesaid U.S. patent.

It is therefore a feature of this invention to provide an improved cutting head or assembly for rotary lawn mowers, edgers, trimmers or the like, which will provide a solution to the aforesaid problems and provide a rotating cutting assembly which is safe for use, which eliminates the aforesaid manual labor, and which can be operated with a minimum of skill.

SUMMARY OF THE INVENTION

This invention is for an improved cutting assembly for a rotary lawn mower, edger, trimmer or the like. It includes a body member arranged for rotation about an axis generally perpendicular with or normal to the cutting plane. It includes at least two nonmetallic cutting lines attached to the body member for rotation therewith in the cutting plane. The line is characterized by being constructed of a material composition to render the line substantially flexible in the static condition. Certain embodiments of the invention includes means for detachably securing the lines to the body member so that the same may be replaced after wear. Means may also be included with the body member for storing supplies of line in the nonworking condition whereby the working length of the lines may be lengthened on occasion as the working length becomes shortened during use thereof. Certain embodiments of the invention may have line storage means supported in the body member, which storage means is in the form of a spool locked from rotation, but which may be released so that additional line may be paid out as the working length becomes shortened during use due to wear.

In the ideal embodiment of the present invention, a circular head member is provided which contains but a single spool of the compound type and being positioned concentrically with the axis of rotation of the motor shaft. The spool includes a pair of stacked storage compartments which each receive a separate cutting strand or string. Each strand extends outwardly of the head member in diametrically opposed relationship one to the other. Thus, with the spool concentrically mounted, this embodiment of the invention permits the device to perform tasks completely beyond the device as depicted in U.S. Pat. No. 3,826,068.

It has been discovered that a cutting line acts in the nature of a fan blade. Thus, as the line is rotated a blowing effect is created. As will be apparent, as the number of lines increase so does this blowing effect. The blowing effect, it is noted, increases power requirements on the motor and also reduces cutting efficiency to the extent that it causes the vegetation, grass for example, to bend down at angles to the cutting plane resulting in an inferior cut. The two string arrangement of the present invention on the other hand minimizes the disadvantages of the blowing effect inherent in the four string device of U.S. Pat. No. 3,826,068.

It has also been discovered that the rotational balance of the head member is related to and effected by the number of line members of the unit acting as flails. Any imbalance is undesirable to the extent that it is transmitted to the bearings and wear portions of the motor which reduces the useful life of the power source. Since balance is a factor, it is preferable to have more than one line member at equally spaced positions around the head. Four line members are not ideal because of the blowing effect previously mentioned. In addition, four lines create wind resistance which in turn increases power requirements on the motor without increasing cutting effectiveness. A two string arrangement has, therefore, been found to be ideal. This arrangement possesses the advantages that its cutting effectiveness is better as compared to single string devices. The two string arrangement, further, has less tendency for unbalance and less production of blowing than the four string variety.

These and other features and advantages of the present invention will become apparent from the following detailed description, wherein reference is made to the Figures in the accompanying drawings.

BRIEF DESCRIPTION OF THE DRAWINGS

FIG. 6 is an exploded view of the parts of the assembly of FIG. 2 in unattached condition.

DESCRIPTION OF THE PREFERRED EMBODIMENT

Figure 1:
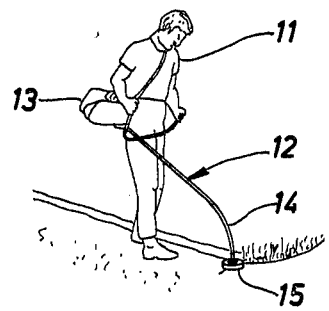
FIG. 1 is a view showing an operator operating a form of portable apparatus with which this invention is adapted for use.

Referring now to FIG. 1, an operator 11 is shown carrying a portable-type lawn mowing and edging device generally designated by the numeral 12, having a power means in the form of motor 13 on the rearward-end thereof and provided with a forwardly extending casing 14 which supports the cutting element designated by the numeral 15 and which provides rotational movement thereto via a rotary drive shaft inside casing 14. By manipulation of casing 14, the cutting plane of cutting element 15 can be arranged to be either horizontal or vertical and used to cut along sidewalks, around trees and rocks, and along fences and the like where it is difficult or unsafe to cut with conventional devices.

Cutting lines suitable for use in accordance with the present invention may be composed of a variety of materials, as for example an elastoplastic extrusion which has been stretched to align the molecules axially. An example of such line is a nylon monofilament such as fishing line. However, other lines may be used, as for example, yarn, cord, rope, twine, braided line, or monofilament, whether described as elastoplastic, elastomeric, natural fiber, or synthetic fiber, and whether compounded of several materials. Nevertheless, there are certain parameters within which the lines must fall in order to be effective.

It is preferable that the cutting lines be of a non-metallic material for reasons of safety. For instance, when metallic lines break, they tend to create projectiles during operation of the device which create hazardous operating conditions.

The cutting lines should preferably have sufficient fatigue, abrasion, and impact resistance to allow reasonable service life. Further, the line should have sufficient tensile strength to allow a reasonable service life. The line should preferably be as lightweight as possible so that when the line shears or breaks during use and is thrown from the cutter head, it will cause the least damage upon contact with persons or objects.

It has been determined that a cutting line fitting within the above parameters will have an effective length to diameter ratio and material composition which renders the line essentially flexible in a static position. This effective length to diameter ratio for the line will usually be greater than 20:1. It has been found that the best cutting lines for the purposes of this invention are extruded nylon line of the type often used as fishing line. The cutting line should have an optimum diameter in the range of 0.062 to 0.082 inches. The maximum range of diameter of the cutting line has been found to be 0.035 to 0.125 inches. Thus, the cutting line should be not less than 0.035 inches in diameter and up to an effective maximum diameter which will be substantially 0.125 inches.

Although the aforesaid cutting lines are essentially flexible while in the static condition, they become rigid and taut under dynamic conditions of rotation. The normal rotating speed is on the order of 3000–8000 RPM depending upon factors such as the extended length of the cutting line, the diameter of the cutting line, and the type of driving means selected. During rotation of the cutting line in the dynamic condition and at the proper speed, the cutting lines are caused to become sufficiently rigid whereby their tips sever vegetation under impact therewith.

To provide optimum tip speed, the housing or head assembly is preferably rotated about 3000–8000 RPM as hereinbefore stated, and is preferably about seven inches in diameter. Effective working length is the length found appropriate to cut vegetation. It has been found that a working length of six and one-half inches is advantageous. Thus, if two lines are used, a cutting path of twenty inches is provided. Effective cutting length is the optimum length of the line member. The effective cutting length of the cutting lines is preferably in the range of three to ten inches, such that the preferable total diameter of housing and cutting lines in the dynamic condition is in the range of fourteen to thirty-four inches. It has also been found that there may be a limit on the number of cutting lines which may be attached to any one disc. If the number is too great, they tend to become tangled.

Referring now to FIGS. 2–8, the embodiment of the invention will be described, which embodiment provides means for paying out the cutting lines as the same become shortened through use.

Figure 3:
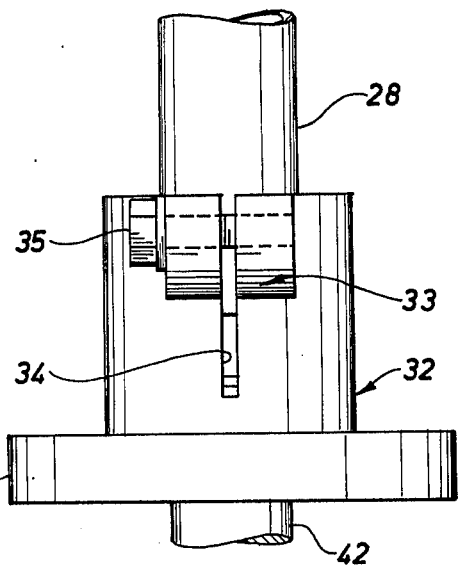
FIG. 3 is a side elevation view along line 3—3 of FIG. 2.
Figure 2:
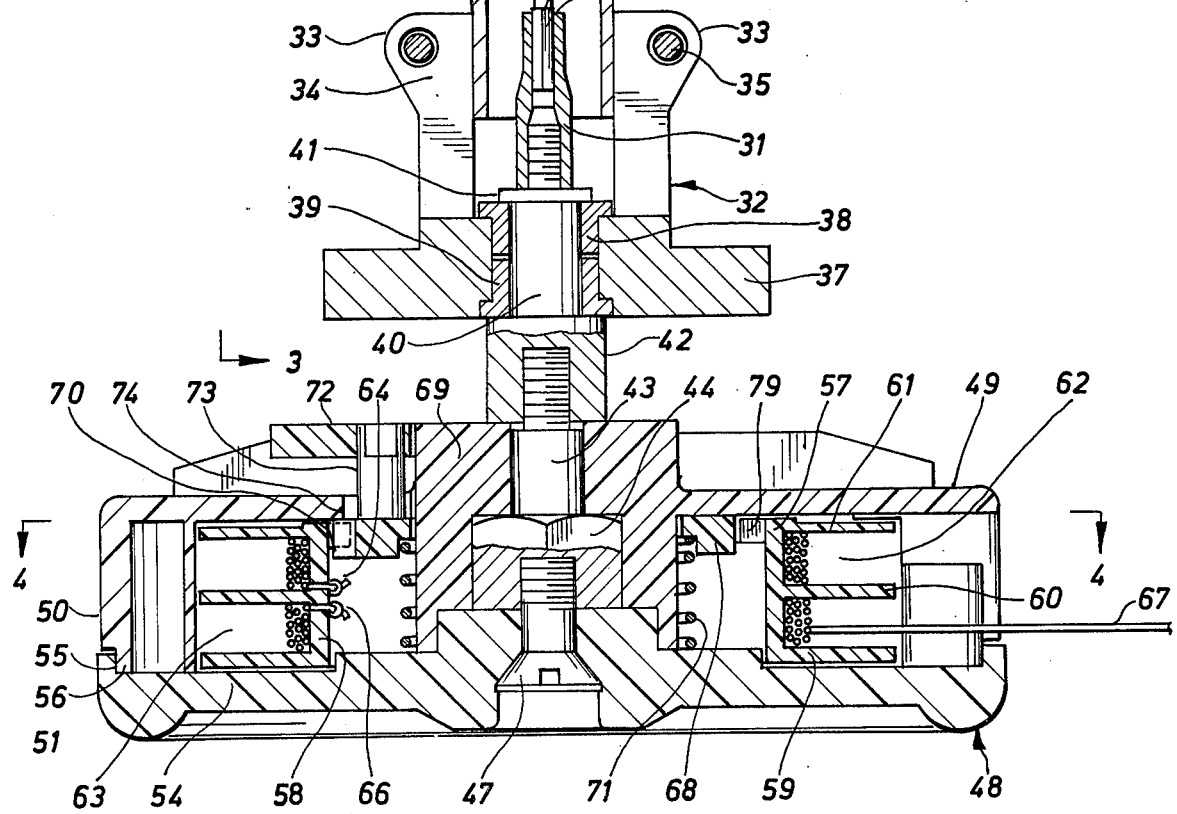
FIG. 2 is a central vertical sectional view of the embodiment having means for storing a supply of lines which may be paid out at predetermined times to lengthen the working length of the cutting lines.

Referring now specifically to FIGS. 2 and 3, a casing 28 is shown having mounted therein flexible drive shaft 29. It is to be understood that drive shaft 29 is arranged for rotation by appropriate power means such as those shown in FIG. 1, so that casing 28 may be turned by the operator to change the cutting plane to horizontal, vertical, or otherwise, as required for the cutting job.

The lower end of drive shaft 29 is provided with a square end 30, which is arranged for insertion into a coupling 31 for rotation therewith. Coupling 31 is arranged for rotation in a power head generally designated by the numeral 32, which is arranged for attachment to the lower end of casing 28 as shown. These attaching means take the form of two oppositely spaced apart lobes 33 having screw holes therethrough and in which are mounted a pair of clamping screws 35. In addition, power head 32 is provided with a longitudinal slot 34 intermediate each of lobes 33 such that, upon tightening of clamping screws 35, power head 32 is frictionally attached to casing 28.

The lower end of power head 32 is provided with an enlarged flange 37 thereabout and with a central aperture therethrough in which is press mounted a pair of bushings 38 and 39.

The lower end of coupling 31 is arranged for threading engagement with drive shaft 40 which extends downwardly therefrom and is spaced from the lower end of coupling 31 by thrust washer 41. Shaft 40 extends downwardly through bushings 38 and 39 and is provided with an enlarged portion 42 which acts as a thrust bearing against lower bushing 39. Portion 42 has threadedly attached to the lower end thereof an insert member 43 with a lower extending portion 44 which extends downwardly therefrom and is arranged for threading engagement with attachment insert 47 in the rotary body generally designated by the numeral 48. Body 48 may be of plastic or metal and is arranged for rotation by shaft 40 and is provided with cutting lines, which are to be described hereinafter.

Rotary body or housing 48 is provided with a top wall member 49 and a side wall member 50 extending down about the sides thereof a substantial distance. Rotary body 48 is arranged for demounting from casing 28 by loosening clamping screws 35, which permits removal of power head 32 from casing 28 and separation of drive shaft 29 from coupling 31. Thereafter, shaft 40 can be removed from coupling 31 and power head 32 and, subsequently, unthreaded from rotary body 48, which permits removal of housing 48 and access to the interior thereof.

Housing 48 is provided with means for storing a supply of cutting lines therein, which cutting lines are arranged for paying out at predetermined times to vary the effective working lengths of the cutting lines.

Figure 4:
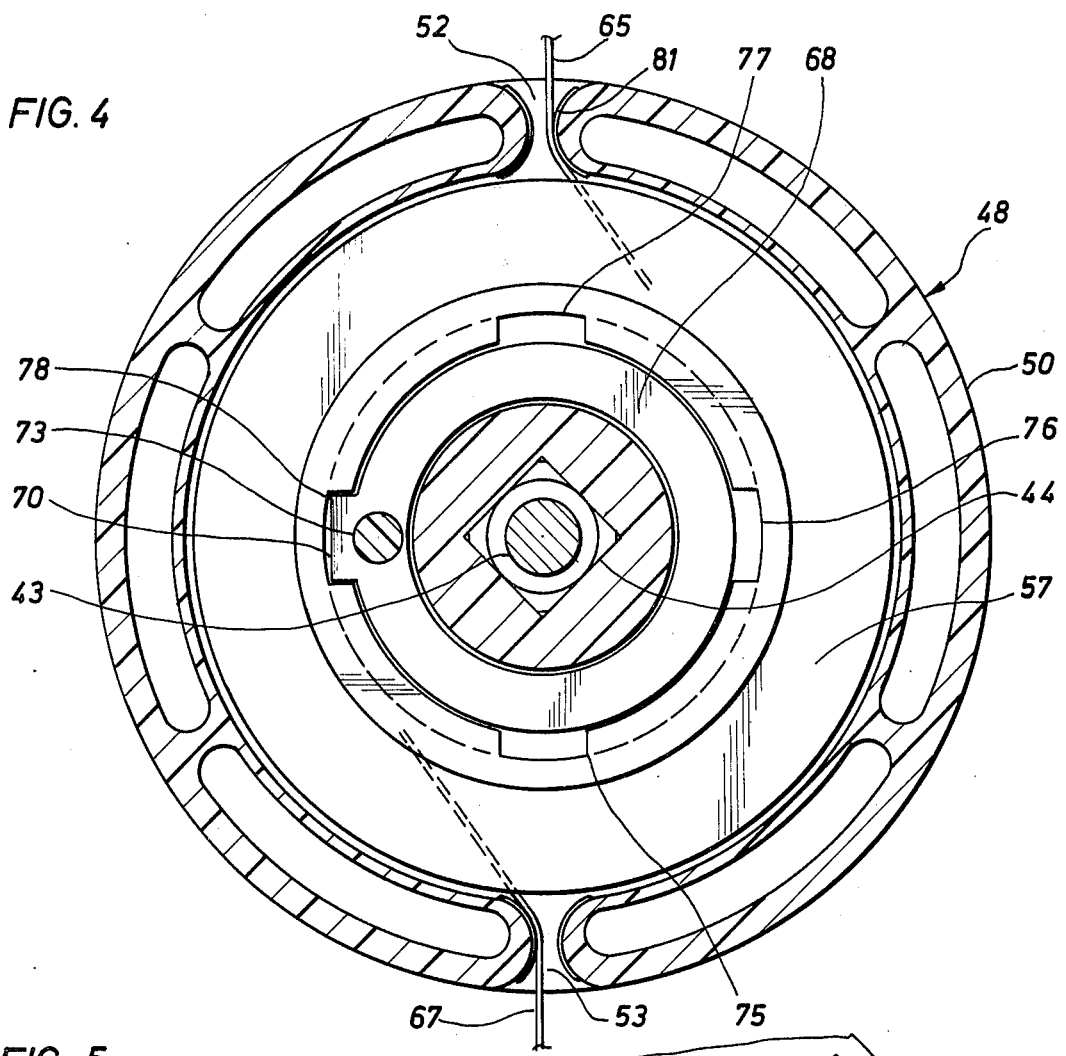
FIG. 4 is a generally cross-sectional view taken along line 4—4 of FIG. 2.

Accordingly, housing 48 is provided with a single spool compartment 51 which is located within rotary housing 48 as shown in FIG. 4. The spool compartment 51 is provided with line exit channels 52 and 53 leading outwardly to the periphery of rotary housing 48 as shown. The outward ends of exit channels 52 and 53 are curved or otherwise streamlined so as to provide a minimum of stress on the cutting lines which are extended radially outwardly thereof.

The upper side of cover member 54 is provided with a recess 55 circumferentially thereabout which is arranged for mating with lower flange 56 of wall 50 as shown in FIG. 2. Thus, by tightening attachment means 47, cover member is drawn into mating engagement with wall member 50 of housing 48.

Within spool compartment 51 is located spool member 57 which comprises a first annular wall 58 having three flange elements 59, 60 and 61 extending radially outwardly therefrom. These flange elements define together with wall 58 a pair of storage compartments indicated at 62 and 63. Spool 57 is arranged for insertion into rotating housing 48 when cover member 54 is removed. In operation of the device, spool 57 rotates along with housing 48, except upon lengthening of the lines as will be described hereinafter.

The spool 57 has wound thereon a supply of cutting line of the aforesaid type. The first supply of cutting line is received in storage compartment 62, with the inward end 64 projecting through an opening in wall 58 which one end of the cutting line 65 may be threaded and knotted as shown on the left side of FIG. 2. The second supply of cutting line is received in compartment 63 with the inward end 66 projecting through a second opening in wall 58 which end of the cutting line 67 may likewise be threaded and knotted as shown. As an alternative, the ends 64 and 66 may be embedded in wall 58 of spool 57 in cases where the spool will be replaced by a prewound replacement spool. There is thus provided a supply of cutting line in each of storage compartments 62 and 63. The opposite end of each cutting line is arranged for paying out through a respective line exit channel 52 and 53 as shown in FIG. 4. Thus, line 65 pays out peripheral aperture 52 while line 67 pays out peripheral aperture 53.

In order to adjust the working length of lines 65 and 67, reference is had to FIG. 4 wherein there is shown an annular locking ring 68 disposed between wall 58 of spool 57 and portion 69 of housing 48. The ring 68 is normally in abutting relationship to wall 49 as in FIG. 2, but is movable downwardly towards cover member 54, such movement being guided by wall 58 and portion 69 of housing 48. Ring 68 includes an outwardly projecting tab member 70 for engagement and disengagement with corresponding stop members of spool 57 to be described hereinafter.

Referring to FIG. 2, there will be seen a spring biasing element designated by numeral 71 and disposed at one end against cover member 54 and at its other end against locking ring 68. Spring 71 biases locking ring 68 against wall member 49 of housing 48 and maintains the ring in this abutting relationship during rotation of housing 48 during vegetation cutting operations.

Figure 5:
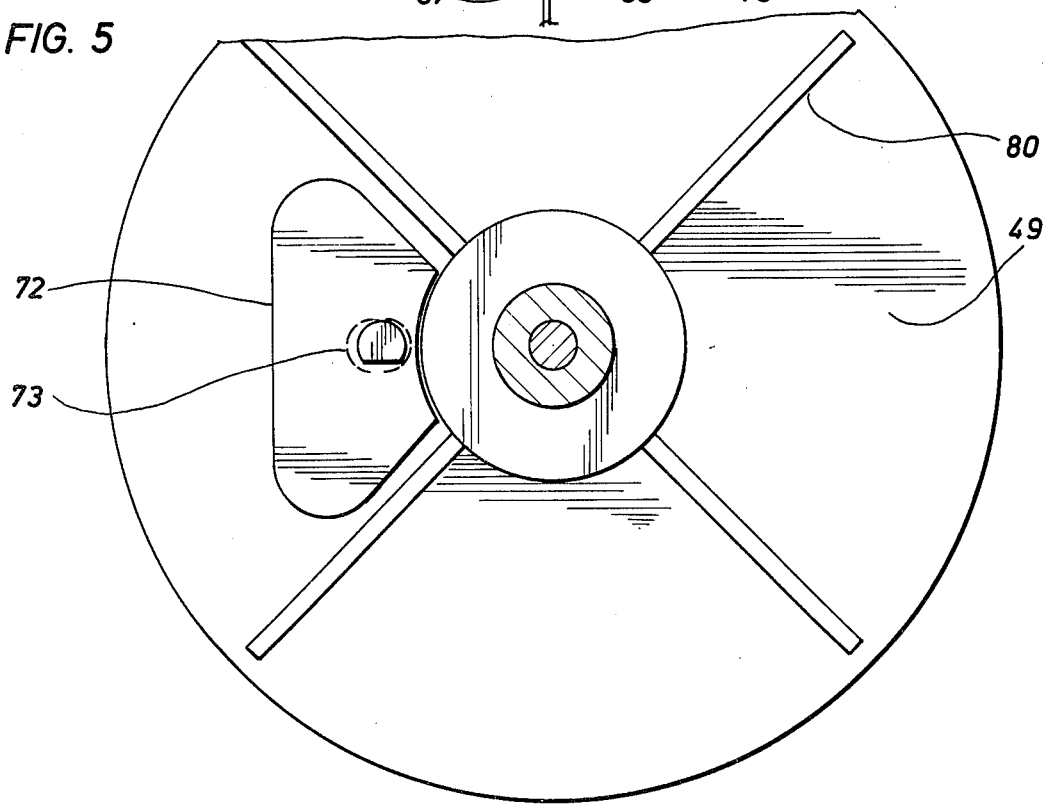
FIG. 5 is a top plan view of the head or housing of FIG. 2.
Figure 8:
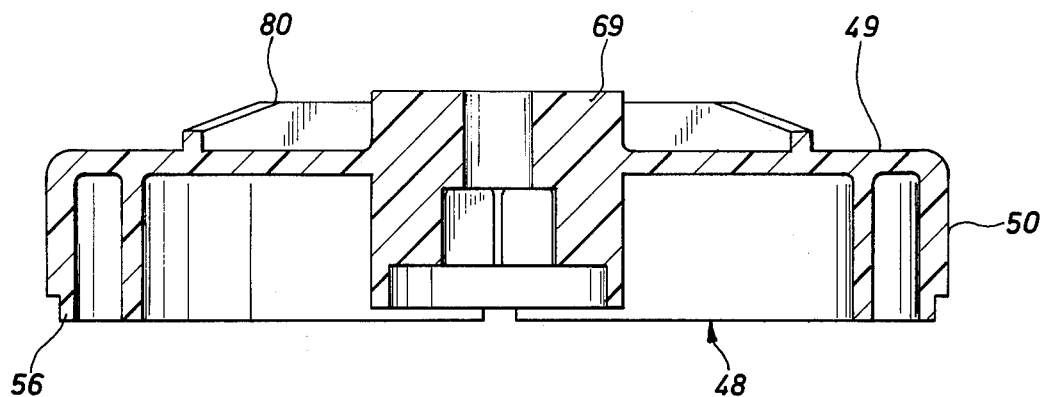
FIG. 8 is a sectional view of the housing shown in FIG. 6.

Located exteriorily of housing 48 as seen in FIG. 5, is a release member 72 having a pin element 73 attached thereto. The pin element 73 is in turn attached to locking ring 68 via a suitable opening 74 extending through wall 49 of housing 48. The release member is adapted to be moved downwardly toward wall 49 by the application of manual pressure being applied thereto. Such movement of release member 72 forces the pin 73 downwardly through opening 74. This action in turn, forces locking ring downwardly towards cover member 54 against the biasing resistance of spring element 71. Upon release of manual pressure applied against member 72, spring element 71 forces locking ring 68 upwardly against wall 49 which in turn, through its connection to pin 73 returns release member 72 to its original position.

With reference again to FIG. 4, spool member 57 will be seen to include along its inner periphery a plurality of step members indicated by numerals 75, 76, 77, and 78. Each stop member is seen to comprise an indent in the inner periphery of spool 57. These indent or stop members are formed in an inwardly extending flange 79 of spool member 57, this flange 79 being located at the upper end of the spool as seen in FIG. 2.

As illustrated in FIG. 4, tab 70 is seen to be engaged by stop member 78. This engagement between elements 70 and 78 lock the spool 57 within housing 48 whereby spool 57 rotates along with housing 48 during the vegetation cutting operation. Upon shortening of line members 65 and 67 due to wear, it is necessary to lengthen the line members by drawing additional line from storage compartments 62 and 63. To achieve this line lengthening, motor 13 is stopped which in turn ceases rotation of housing 48 and its associated assembly. Manual pressure is then applied to release member 72. This forces pin 73 downwardly which in turn moves locking ring 68 towards cover member 54 against the bias of spring 71. Such downward movement of locking ring 68 frees the engagement of tab 70 with stop member 78. This freeing of engagement between elements 70 and 78 releases spool element 57 for rotational movement within housing 48. Thus, with the release member 72 held down, the exteriorly extending portions of lines 65 and 67 may be grasped and pulled outwardly of housing wall 50. This pulling of the lines causes spool 57 in housing 48 to pay out more line length as it rotates within the housing. The line is pulled until a sufficient length extends exteriorily of the housing at which time flange 79 will have rotated to one of the other stop positions 75, 76, or 77, depending upon how much line is removed. Upon release of pressure upon element 72, the spring forces locking ring back against the wall 49 of housing 48 and this return movement of locking ring 68 again engages the tab 70 with one of the other stop members 75, 76 or 77. Upon reengagement of the tab 70 with one of the stop members, the spool 57 is again locked for rotation with housing 48 rather than with respect thereto. It should therefore be apparent that the upward position of locking ring 68 against housing wall 49 locks spool 57 for rotation with housing 48, whereby the depressed lower position of locking ring 68 frees spool 57 for rotation within housing 48 for the purpose of paying out additional line.

Figure 7:
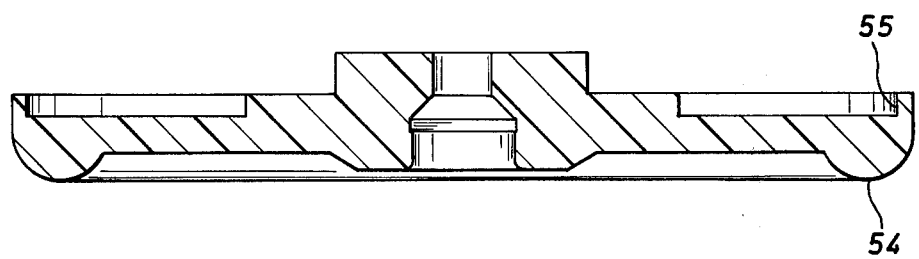
FIG. 7 is a sectional view of the cover shown in FIG. 6.

In FIG. 6, is shown an exploded view of the assembly above-referred to with identical parts in FIG. 6 corresponding to parts referred to above with respect to FIGS. 2-5. FIG. 7 similarly shows cover member 54 in more detail for a better understanding of its shape and construction. In a similar manner, the housing or head assembly 48 is shown on a larger scale in FIG. 8, identical parts and numerals corresponding to FIGS. 2-5 above.

Referring again to FIGS. 5, 6 and 8, top wall member 49 of the housing 48 will be seen to include a plurality of upstanding and radially extending fins 80, only one being numbered, extending from portion 69 of the housing and terminating short of peripheral wall 50. Inclusion of these fin members with upper wall member 49 serves to strengthen the overall construction of housing 48 and to provide a degree of rigidity thereto, in order to withstand rugged treatment of the assembly during use.

Figure 9:
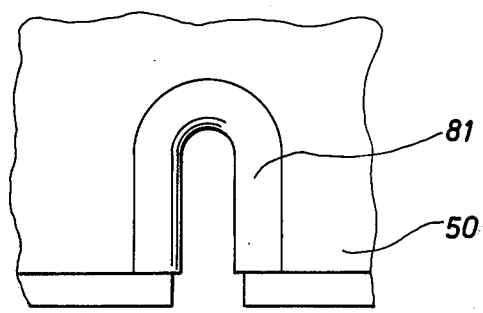
FIGS. 9 and 10 are detailed views of the bearing element feature of the invention.
Figure 10:
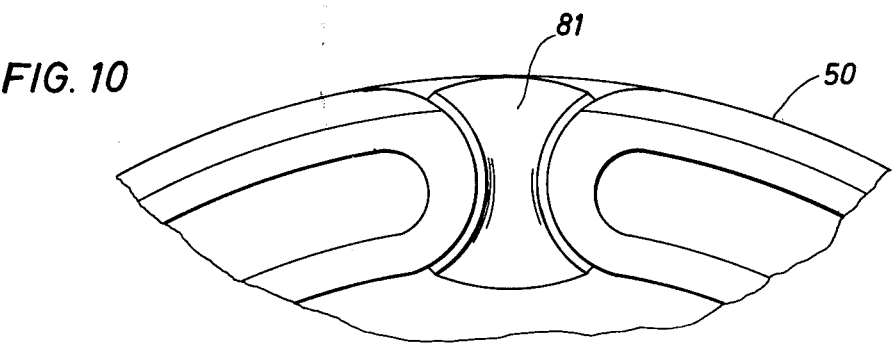

In FIGS. 9 and 10, is shown a further feature of the disclosed rotary cutting assembly wherein each peripheral aperture 52 and 53 is lined with a metallic bearin member denoted generally by the numeral 81. The disposition of the metallic bearing element in each peripheral aperture of housing wall 50 may also be seen in FIG. 4. As shown in FIGS. 4, 9 and 10, the bearing element 81, is essentially saddle-shaped in configuration and follows generally the contour of the curvilinear portions of wall 50 which define each peripheral aperture. The bearing element is preferably constructed of brass metal although other metallic materials are useful. The bearing element 81 is press-fitted into the aperture and will remain in place therein and in abutting relationship to the curvilinear wall sections defining the aperture. The details of this metallic bearing element, its function, design, and operation, are set forth more fully in copending U.S. application Ser. No. 633,456, filed Nov. 19, 1975, now U.S. Pat. No. 4,035,912. It should be noted herein, however, that the metallic bearing elements 81 lodged within each of the peripheral apertures of wall member 50 function to reduce the breakage rate of the cutting line members 65 and 67 by reducing friction and heat generated between the points of contact of the line members with portions of the rotatable housing 48. It has been determined through usage of the present invention that, wherever metal-to-plastic contact can be established at such points of frictional engagement, reduction or dissipation of generated heat is sufficient to eliminate melting or softening of the cutting lines, thereby keeping line breakage to a minimum.

In operation, the apparatus is assembled with cutting lines 65 and 67 extending generally radially outwardly therefrom to the desired lengths. Thereafter, rotary body 48 is rotated by rotation of shaft 29 to the desired rotational speed. As a result, lines 65 and 67 will be extended radially outwardly. from body 48 to the cutting plane, where cutting, lawn edging, or the like may be effected. As lines 65 and 67 become shortened through use, they can thereafter be lengthened by terminating rotation of rotary body 48, pressing downwardly on release 72, and pulling on lines 65 and 67 to extend them to the desired distance. Thereafter, pressure is relieved on release 72 and spring 71 urges ring 68 back to the lock position, at which point cutting operations can be continued.

It will thus be apparent that this invention provides the art with an apparatus which can quickly, easily, and efficiently cut grass, weeds, and the like; over, under, around, and between trees, posts, bushes, buildings, and other stationary objects, or the like. Further, this apparatus will be particularly safe for the operator in that the hazardous conditions prevalent in prior art apparatus have been essentially eliminated. By making the apparatus available in a portable embodiment, the cutting plane can be effected in any direction so as to accommodate both cutting and trimming operations as heretofore described, thereby eliminating the need for manual labor in certain difficult cutting operations.

The apparatus of this invention can be used successfully in yard trimming and cleaning operations where there is considerable debris, such as bottles, cans, paper, wood, wire and the like, without creating a dangerous condition in that the cutting elements of this device do not create missiles of such trash. Because of the nature of the cutting element of this invention, such objects are not thrown, but rather the cutting element acts in a resilient fashion in such a manner as not to impart sufficient force to such articles to become missiles; or if they are thrown, it is at a very low velocity relative to prior state of the art machines. Experience has shown that in operating an apparatus of this device with lines of the type described, the cutting lines may accidentally come in contact with the operator's shoes, articles of clothing, or the like, without serious injury as would be the case with prior art devices. Further, in the event a portion of the cutting line is thrown from the apparatus, such thrown portions possess low mass and low kinetic energy and, therefore, quickly lose velocity and energy, thus rendering the same virtually harmless.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. As a subcombination,
   a spool-like member having a hollow core portion with at least three spaced apart external flange portions extending radially outwardly from the outer periphery of said core portion;
   said core portion being open internally at one end thereof and with one of said external flanges being integrally joined to said core portion at said one end and terminating at the inner periphery of said one end of said core portion and at the other end having an internal flange integral with another of said external flanges and extending inwardly of the inner periphery of said core portion towards the axis of said core portion but in annular spaced relationship thereto;
   said internal flange having a plurality of uniformly shaped and uniformly angularly spaced-apart recesses therein for sequentially accomodating a key member; and
   a pair of flexible non-metallic line members each being wound about the outer periphery of said core portion between respective pairs of said external flanges.

* * * * *